(12) United States Patent
Lendenmann (10) Patent No.: US 8,545,293 B2
(45) Date of Patent: Oct. 1, 2013

(54) STICK FEEDING UNIT IN A SUSPENSION DEVICE FOR SAUSAGE-TYPE PACKAGING UNITS

(75) Inventor: Max Lendenmann, Wil (CH)

(73) Assignee: Tipper Tie Alpina GmbH, Flawil (CH)

( * ) Notice: Subject to any disclaimer, the term of this patent is extended or adjusted under 35 U.S.C. 154(b) by 0 days.

(21) Appl. No.: 13/641,824

(22) PCT Filed: Apr. 27, 2011

(86) PCT No.: PCT/CH2011/000092
§ 371 (c)(1),
(2), (4) Date: Dec. 28, 2012

(87) PCT Pub. No.: WO2011/134096
PCT Pub. Date: Nov. 3, 2011

(65) Prior Publication Data
US 2013/0095737 A1   Apr. 18, 2013

(30) Foreign Application Priority Data
Apr. 30, 2010   (CH) .......................... 659/10

(51) Int. Cl.
*A22C 11/00* (2006.01)
(52) U.S. Cl.
USPC .......................................................... 452/51
(58) Field of Classification Search
USPC ................................................... 452/21–51
See application file for complete search history.

(56) References Cited

U.S. PATENT DOCUMENTS

| | | | |
|---|---|---|---|
| 4,388,039 A | | 6/1983 | Schwarze |
| 4,612,684 A | | 9/1986 | Kollross |
| 6,080,055 A | * | 6/2000 | Leining et al. ................. 452/50 |
| 7,121,940 B2 | * | 10/2006 | Haschke et al. ............... 452/51 |
| 7,166,021 B2 | * | 1/2007 | Stimpfl ........................... 452/32 |
| 7,255,638 B2 | * | 8/2007 | Stimpfl ........................... 452/32 |
| 7,563,158 B2 | * | 7/2009 | Haschke ....................... 452/141 |
| 7,722,447 B2 | * | 5/2010 | Haschke ......................... 452/51 |
| 7,824,250 B2 | * | 11/2010 | Topfer ............................ 452/51 |
| 8,366,522 B2 | * | 2/2013 | Wally et al. .................... 452/32 |
| 2005/0159093 A1 | | 7/2005 | Kasai |

FOREIGN PATENT DOCUMENTS

| | | |
|---|---|---|
| DE | 218270 | 2/1983 |
| DE | 221978 | 5/1984 |
| DE | 3933026 | 4/1990 |
| DE | 4013033 | 11/1990 |
| EP | 0424675 | 5/1991 |
| EP | 1891858 | 2/2008 |
| EP | 1891859 | 2/2008 |

(Continued)

OTHER PUBLICATIONS

English language translation of the International Search Report for corresponding PCT Application No. PCT/CH2011/000092, mail date Sep. 13, 2011.

*Primary Examiner* — Richard Price, Jr.
(74) *Attorney, Agent, or Firm* — Myers Bigel Sibley & Sajovec, P.A.

(57) ABSTRACT

The invention relates to a smoking stick feeding unit (10) which comprises lifting device (12) that allow a plurality of smoking sticks (15) to be lifted simultaneously. In the top position of lift, the top smoking stick is transferred to a transport means for a horizontal movement into the loading position. The smoking stick feeding unit can be used to feed smoking sticks for loading with very long packaging units or sausages in a suspension device.

15 Claims, 7 Drawing Sheets

(56) References Cited

FOREIGN PATENT DOCUMENTS

| | | |
|---|---|---|
| EP | 1891860 | 2/2008 |
| EP | 1985185 | 10/2008 |
| ES | 2011339 | 1/1990 |
| JP | 7023693 | 1/1995 |

* cited by examiner

STICK FEEDING UNIT IN A SUSPENSION DEVICE FOR SAUSAGE-TYPE PACKAGING UNITS

RELATED APPLICATIONS

This application is a 35 USC§371 national phase application of PCT/CH2011/000092, filed Apr. 27, 2011, which claims the benefit of and priority to Swiss Application Serial No. 659/10 filed Apr. 30, 2010, the contents of which are hereby incorporated by reference as if recited in full herein.

TECHNICAL FIELD OF THE INVENTION

The invention relates to a stick feeding unit in a suspension device for suspending sausage-type packaging units on sticks, wherein the unit is adapted to simultaneously move a plurality of sticks vertically and to separate sticks in a horizontal direction in the suspension position.

BACKGROUND

A stick feeding unit of the type mentioned at the beginning is known from European patent application EP 1 891 858 A1. This stick feeding unit has proved its worth in the known suspension line comprising a closing device for sausage-type packaging units and a suspension device for the packaging units provided with hanging loops. Such suspension lines and the known stick feeding unit are however not suitable for particularly long packaging units or sausages or sausage chains respectively, which have a length of e.g. between one meter and two meters.

DESCRIPTION OF THE INVENTION

The objective of the invention is to provide a stick feeding unit in a suspension device, which is suitable for feeding sticks for very long packaging units in a suspension device.

This objective is solved with the unit mentioned at the beginning in such a way that the stick feeding unit comprises an actuated lifting means for moving the sticks upwards and actuated transport means which are movable horizontally and which are adapted to take over the sticks for the horizontal movement from the topmost lift position of a smoke stick in the lifting means.

By lifting the sticks upwards it is possible to provide a charging of the stick feeding unit with the sticks in a working height which is comfortable for the operator, even if the sticks have to be lifted up very high for the charging with very long packaging units, until they will carry out the horizontal movement into the charging position in order to be charged with the packaging units or the sausages respectively.

A charging table is preferably arranged directly at the lifting means, onto which the sticks can be arranged for the manual charging of the lifting means. The lifting means is preferably formed by two transport members, particularly transport chains, which have a plurality of opposed receptacles for the ends of the smoke sticks. Preferably the receptacles are L-shaped receptacles, thus allowing an easy charging. Preferably, the topmost smoke stick is received, in its topmost lifting position, by a U-shaped transport means which is opened downwards, in such a way that the lifting means lifts the smoke stick into the interior of the transport means. This allows the easy "gripping" by the arms of the U which is opened downwards and which overlaps the smoke stick. The smoke stick is then brought into the charging position by means of a linear horizontal movement of the transport means directly or via an intermediary position in which the transport means releases the smoke stick, preferably in such a way that it falls down by means of gravity. The transport means is then moved back into the position above the lifting means, such that the next smoke stick can be lifted up into the transport means.

SHORT DESCRIPTION OF THE DRAWINGS

Embodiments of the invention are described in the following in more detail by means of the drawings. Thereby it is shown in FIG. 1 a front view of an arrangement comprising a closing device and a suspension device.

WAYS OF CARRYING OUT THE INVENTION

Figure 1:
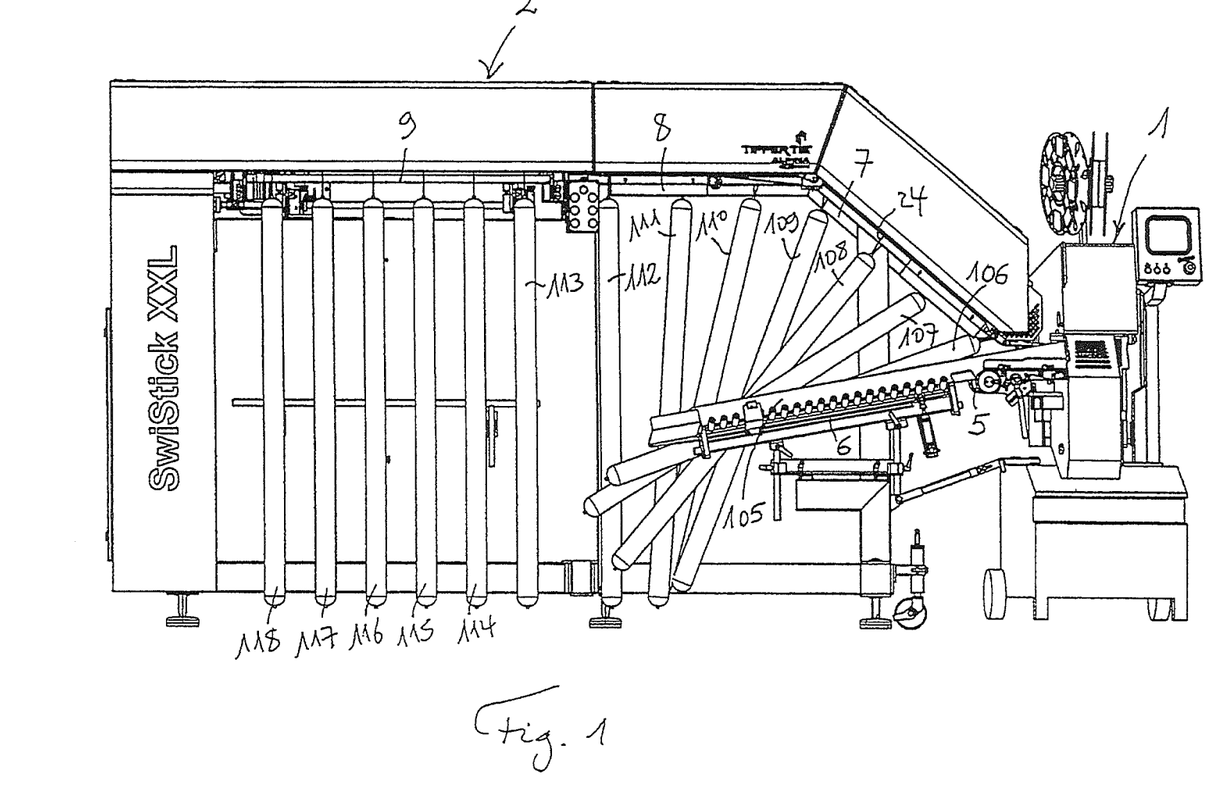

FIG. 1 shows in a front view an arrangement comprising a closing device 1 for sausage-type packaging units and a suspension device 2 for such packaging units to each of which a hanging loop 24 has been attached in a known way by the closing device. The closing of the packaging units or sausages respectively, is carried out in a known way by clips. It is pointed to the European patent application EP 1 891 860, in which this is described. A filling device which is not shown would be arranged on the right side of the closing device 1, the filling tube of which protrudes into the closing device, as known.

In FIG. 1 it can be seen how a very long sausage-type packaging unit 105 leaves the closing device and lies on a conveyor belt 5 and a tiltable receptacle 6. The further packaging units with the reference numerals 106-118 have previously left the closing device successively in this manner as well. After the attachment of the hanging loops 24 to each one of the packaging units in the closing device, this hanging loop is gripped by the suspension device 2, such that the respective packaging unit is transported onwards by transporting the hanging loop 24, after it has left the closing device. The gripping of the hanging loop may be carried out by any means known to the skilled person, particularly by a hook arranged on a transport means. The transport in the suspension device 2 is done in the shown example first in a rising section 7 of the device 2 and thereafter in a subsequent horizontal section 8 of the suspension device 2. Thereafter, a transfer to a further horizontal transport section 9 occurs, in which a suspension of the packaging units on a smoke stick 15 is done in a known way. For this suspension or the positioning and the release of the packaging units it is pointed to the European patent application EP 1 891 859, in which such a transfer to a smoke stick is described in detail in the sections [0009] to [0013] with reference to the figures. This description is brought to the attention of the skilled person and is incorporated herein by reference.

Figure 2:
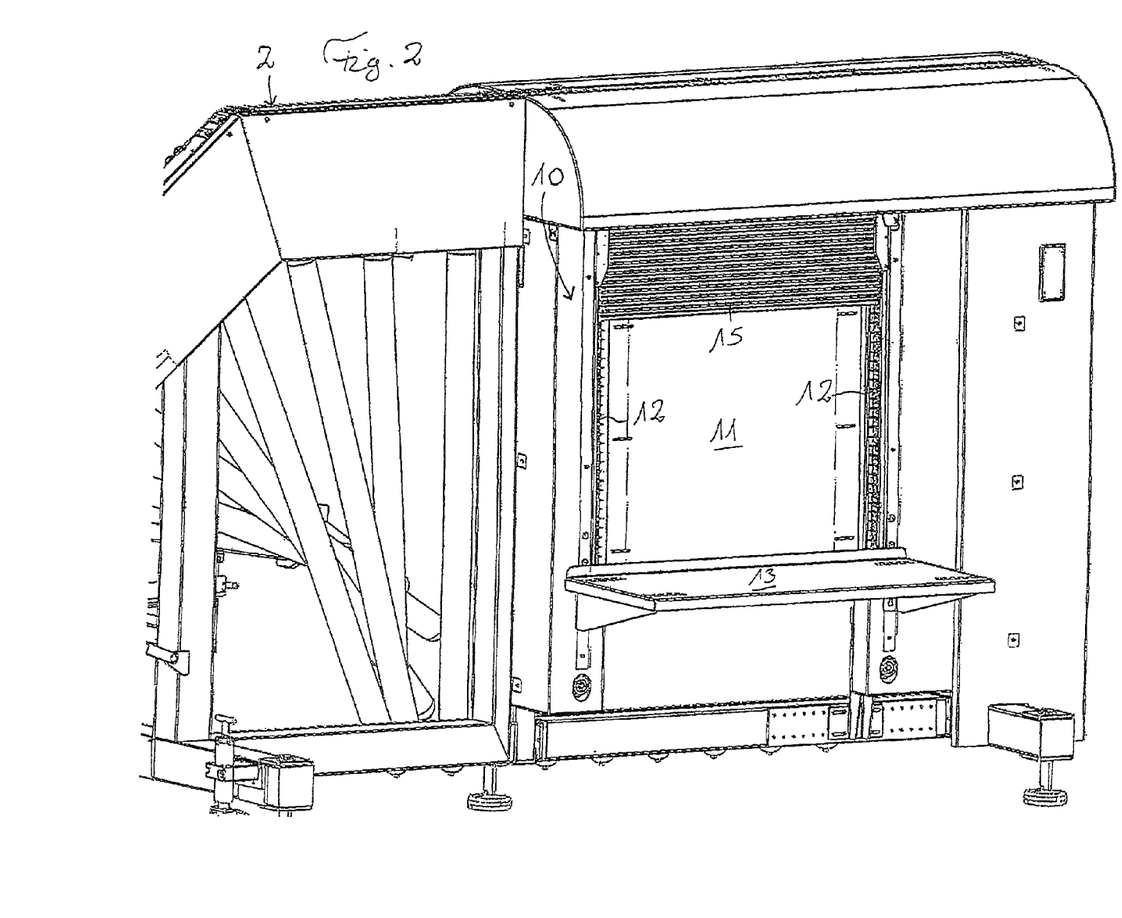
FIG. 2 a rear view of the suspension device of the arrangement of FIG. 1 with the stick feeding unit.

FIG. 2 shows the suspension device 2 from the rear side, wherein same reference numerals denote same elements, as it is the case in FIG. 1. The stick feeding unit 10 according to this embodiment of the invention can be seen from the rear side of the suspension device 2. The stick feeding unit 10 lifts up a plurality of sticks 15, of which only some are shown, to which end a lifting means 12 is provided. The lifting means grips the two ends of each stick in order to move it upwards. A separating wall 11 towards the front side of the device 2 may be provided, as well as a charging table 13 which is arranged directly at the lifting means and which serves to lay down the smoke sticks 15, which are then manually charged into the lifting means 12.

Figure 3:
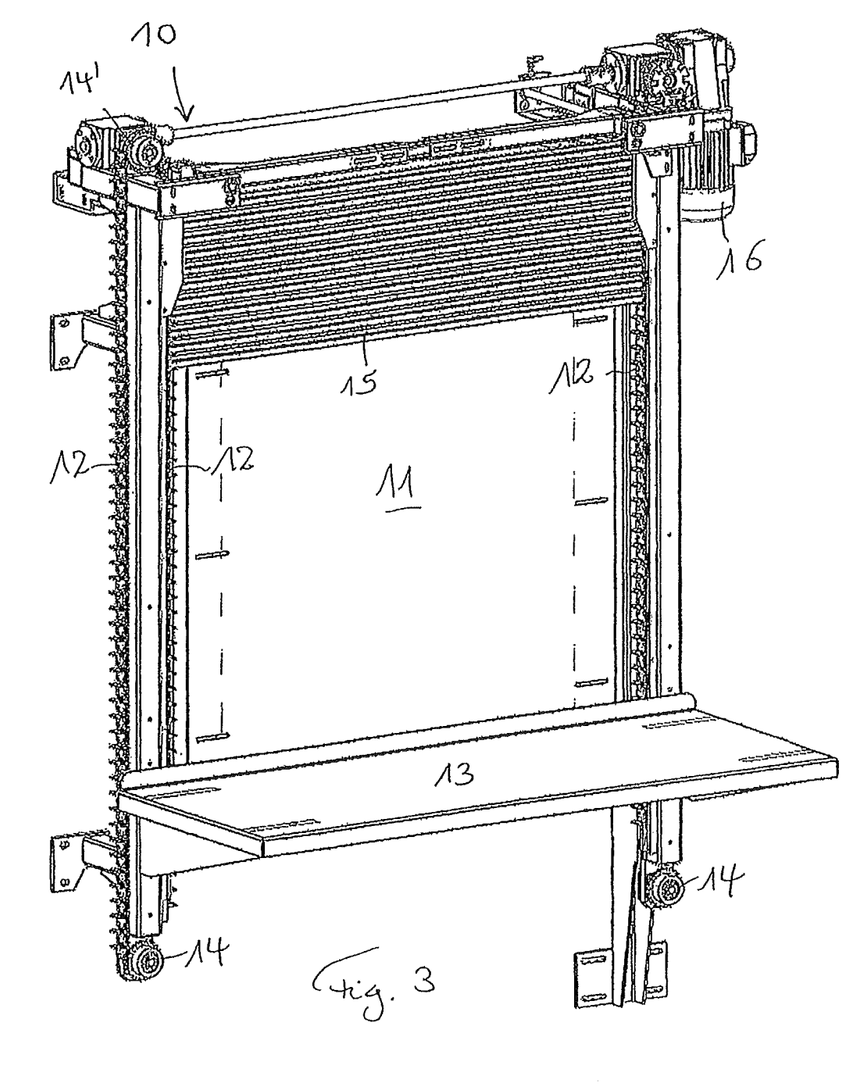
FIG. 3 the stick feeding unit in a graphical view.
Figure 4:
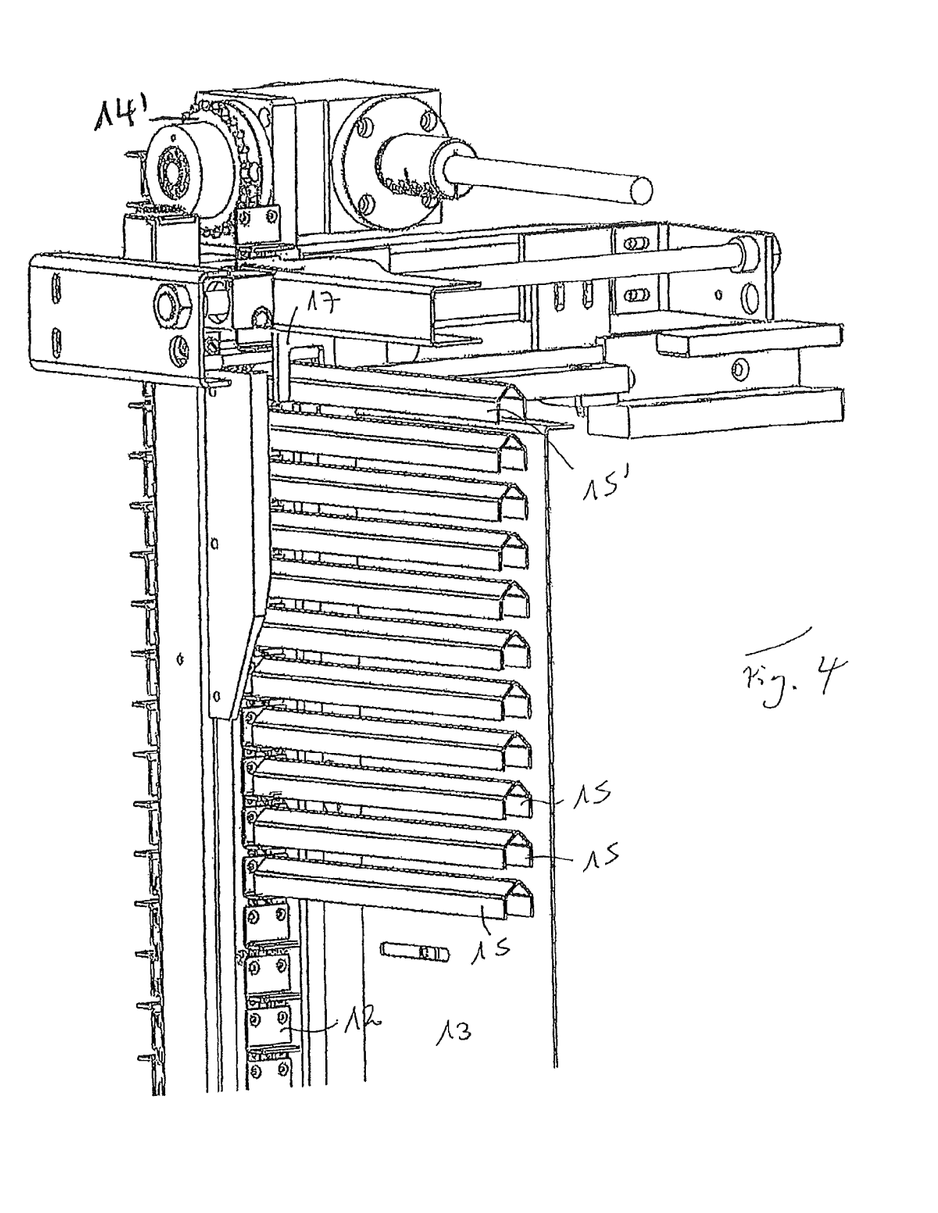
FIG. 4 a detail view of the unit of FIG. 3.

FIG. 3 shows the stick feeding unit 10 separately from the suspension device 2. Lower and upper deflection positions 14 and 14' for the lifting means 12 moved by gearboxes can be seen. The actuation is carried out by e.g. a servo motor 16, in order to execute the stepwise lifting up of the smoke sticks, as this will be described later. FIG. 4 shows a detail view in a vertical sectional view through the smoke sticks 15 or the unit 10 respectively, in which the lifting means 12, which forms a plurality of L-shaped receptacles for the smoke sticks 15, can be seen in more detail. The L-shaped receptacles allow a simple insertion of the smoke sticks into the lifting means 12. The topmost smoke stick 15' in the lifting means has reached the position in which it has to be moved horizontally by the stick feeding unit or its transport means, in order to get into the charging position in which the packaging units 105-118 with their hanging loops 24 are put down onto the respective smoke stick in a known way.

In FIG. 4 it can be seen that the topmost smoke stick 15' has been inserted with the previous lifting step into a U-shaped holder 17 opened downwards of the transport means by the lifting means 12. Such a holder is also provided at the other end of the smoke stick 15' which is not visible.

Figure 5:
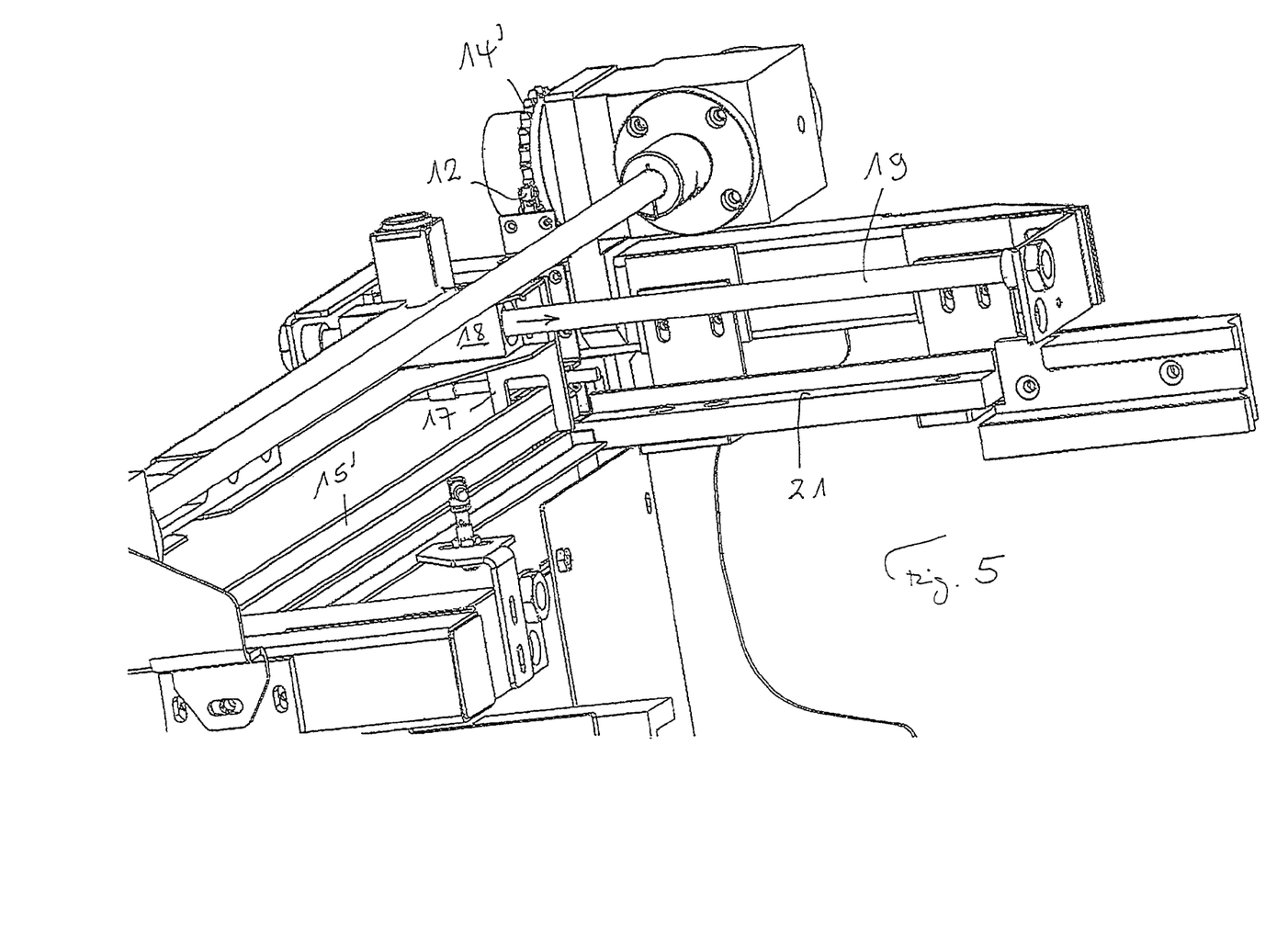
FIG. 5 a graphical view of a part of the stick feeding unit for describing the horizontal separation by the transport means.
Figure 6:
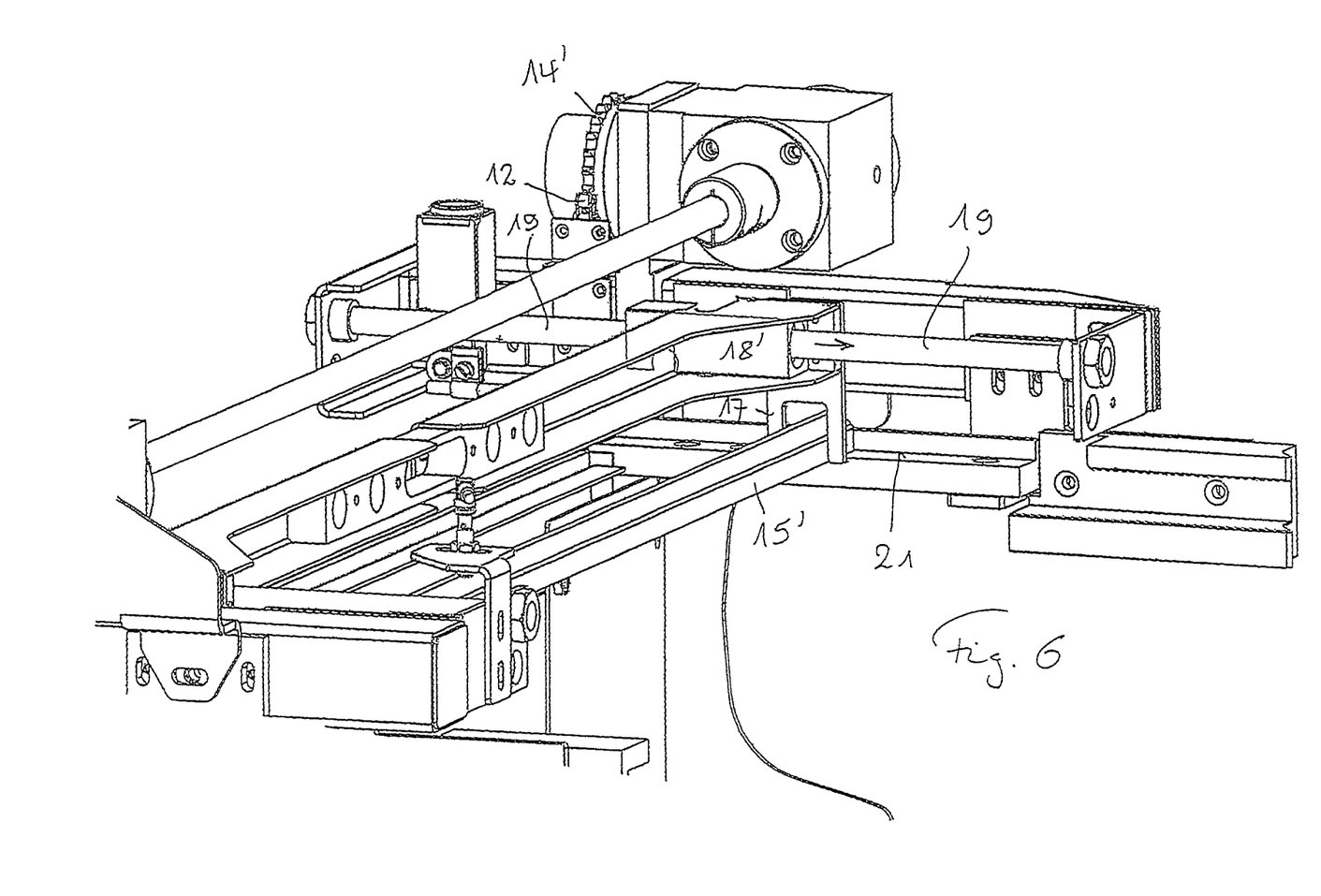
FIG. 6 a graphical view according to FIG. 5 with a stick moving forward.
Figure 7:
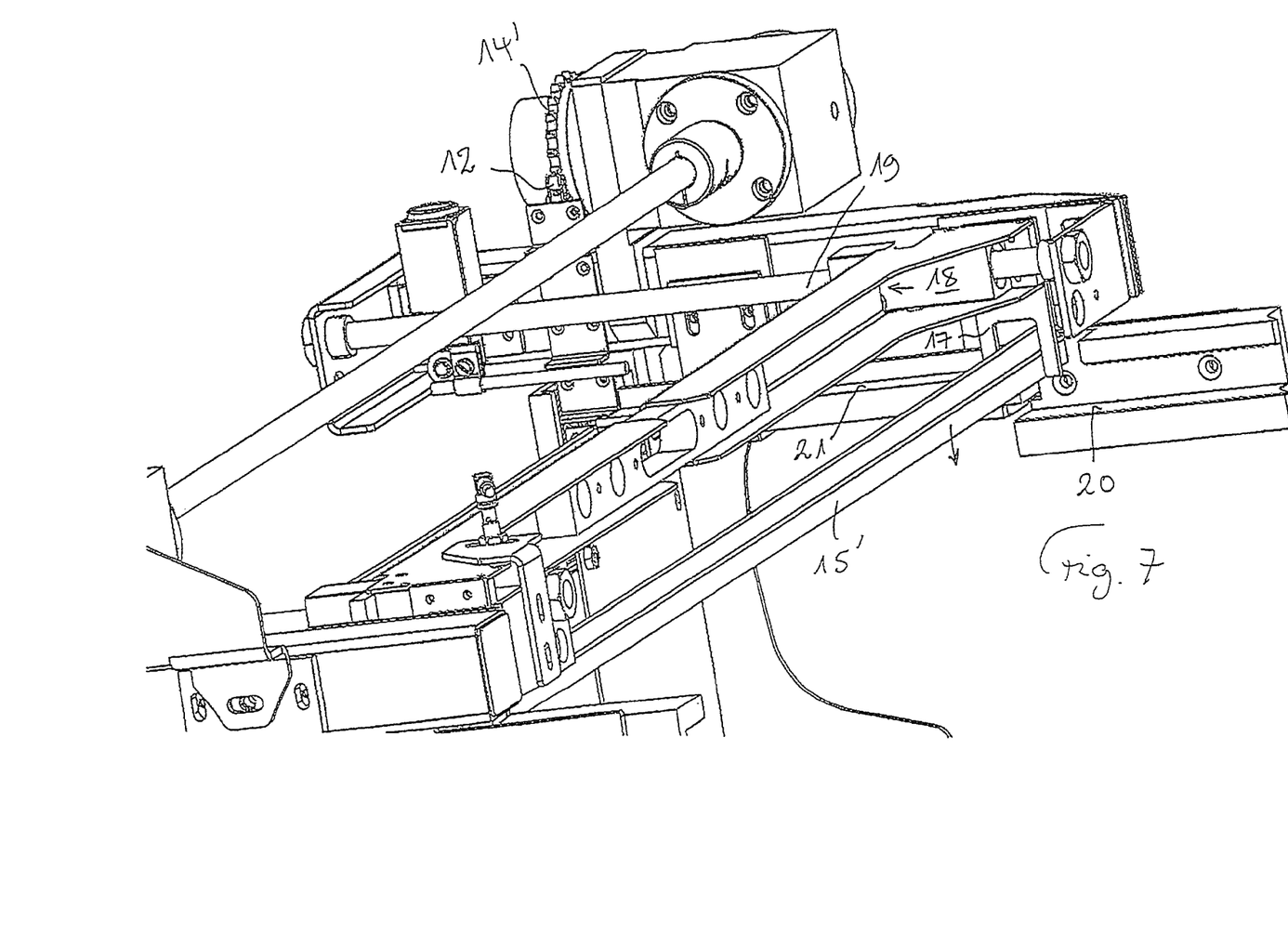
FIG. 7 a graphical view according to FIGS. 5 and 6 with the stick moved up to the front.

FIGS. 5-7 now show the horizontal movement of the smoke stick 15' by the holders 17 which shift the smoke stick along a horizontal supporting surface 21. For this, a shiftably actuatable shifting guide 18 is provided, being operatively connected with the holder 17 and being movable on a horizontal guiding bar 19 in the direction of the arrow of FIG. 5. FIG. 6 shows how the smoke stick 15' is displaced accordingly and FIG. 7 shows how the smoke stick 15' has already passed the end of the guide surface 21, such that the smoke stick 15' is passed on downwards to the additional guide surface 20. This may be carried out in a free fall or with a lowering/lifting device. A further displacement takes place on this surface, in the figure to the right, by means of an actuating means which is not shown and which pushes the smoke stick 15' further to the right with respect to the figure. The smoke stick 15' is then held in this charging position and charged, as known in detail to the skilled person from EP 1 891 858 and therefore not having to be described anymore. As soon as the smoke stick 15' has left the holder 17 in FIG. 7, this holder can be driven back into the position according to FIG. 5 and the smoke stick 15" which is next in the lifting device 12 is lifted by the lifting device, such that this smoke stick gets into the holder 17 and takes on the position of the topmost smoke stick shown in FIG. 4. Then the horizontal movement of the smoke stick into the charging position is again carried out.

The invention claimed is:

1. Stick feeding unit in a suspension device for sausage-type packaging units suspended on sticks, wherein the unit is provided to simultaneously move a plurality of sticks vertically and to separate sticks in a horizontal direction in the suspension position, characterized in that the stick feeding unit comprises an actuated lifting means for moving the sticks upwards and actuated transport means which are movable horizontally and which are adapted to take over the sticks for the horizontal movement from a topmost lift position of a smoke stick in the lifting means.

2. Stick feeding unit according to claim 1, characterized by a charging table arranged directly at the lifting means.

3. Stick feeding unit according to claim 2, characterized in that the lifting means is formed by two transport members which are actuated in a synchronously revolving way, having a plurality of opposed receptacles for the ends of the smoke sticks.

4. Stick feeding unit according to claim 2, characterized in that the transport means has U-shaped holders which are opened downwards, into which the extremities of the topmost smoke stick are lifted by the lifting means.

5. Stick feeding unit according to claim 1, characterized in that the lifting means is formed by two transport members which are actuated in a synchronously revolving way, having a plurality of opposed receptacles for the ends of the smoke sticks.

6. Stick feeding unit according to claim 5, characterized in that the receptacles are L-shaped and are arranged with a lower L-arm pointing towards each other.

7. Stick feeding unit according to claim 6, characterized in that the transport means has U-shaped holders which are opened downwards, into which the extremities of the topmost smoke stick are lifted by the lifting means.

8. Stick feeding unit according to claim 5, characterized in that the transport means has U-shaped holders which are opened downwards, into which the extremities of the topmost smoke stick are lifted by the lifting means.

9. Stick feeding unit according to claim 1, characterized in that the transport means has U-shaped holders which are opened downwards, into which the extremities of the topmost smoke stick are lifted by the lifting means.

10. Stick feeding unit of claim 1 in combination with a suspension device for sausage-type packaging units provided with hanging loops, adapted to suspend these packaging units on smoke sticks.

11. A device for sausage-type packaging units, comprising: a smoking stick feeding device for sausage-type packaging units, wherein the smoking stick feeding device comprises (i) an actuated lift that is configured to simultaneously move a plurality of horizontally oriented and vertically aligned sticks vertically upward and (ii) an actuated transporter that moves a topmost positioned stick laterally away from the vertically aligned sticks, while horizontally oriented, to a suspension position for suspending sausage-type packaging units.

12. The device of claim 11, further comprising a charging table arranged at a lower portion of the lift.

13. The device of claim 11, wherein the lift comprises two spaced apart cooperating transport members which are actuated in a synchronized revolving motion, the transport members having a plurality of opposed receptacles for releasably holding opposing ends of the smoke sticks.

14. The device of claim 13, wherein the transport member receptacles are L-shaped arms arranged with a lower portion of the L-shaped arm pointing towards each other.

15. The device of claim 11, wherein the transporter comprises U-shaped holders which open downward.

* * * * *